US010110294B2

(12) United States Patent
Nimmala et al.

(10) Patent No.: US 10,110,294 B2
(45) Date of Patent: *Oct. 23, 2018

(54) ADAPTIVE USE OF RECEIVER DIVERSITY

(71) Applicant: Apple Inc., Cupertino, CA (US)

(72) Inventors: Srinivasan Nimmala, San Jose, CA (US); Navid Damji, Cupertino, CA (US); Tarik Tabet, San Jose, CA (US); Li Su, San Jose, CA (US); Longda Xing, San Jose, CA (US); Zhu Ji, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/952,319

(22) Filed: Nov. 25, 2015

(65) Prior Publication Data
US 2016/0080067 A1 Mar. 17, 2016

Related U.S. Application Data

(63) Continuation of application No. 13/900,197, filed on May 22, 2013, now Pat. No. 9,226,175.
(Continued)

(51) Int. Cl.
*H04B 7/08* (2006.01)
*H04W 24/02* (2009.01)
*H04W 52/02* (2009.01)

(52) U.S. Cl.
CPC ......... *H04B 7/0877* (2013.01); *H04B 7/0814* (2013.01); *H04B 7/0822* (2013.01);
(Continued)

(58) Field of Classification Search
CPC . H04B 7/0877; H04W 52/0225; H04W 24/02
See application file for complete search history.

(56) References Cited

U.S. PATENT DOCUMENTS 7,072,628 B2 7/2006 Agashe et al.
7,849,506 B1 12/2010 Dansey et al.
(Continued)

FOREIGN PATENT DOCUMENTS

CN 101263658 A 9/2008
CN 102647221 A 8/2012
(Continued)

OTHER PUBLICATIONS

European Patent Application No. 13878911.0—European Examination dated Aug. 1, 2016.
(Continued)

*Primary Examiner* — Rasheed Gidado
(74) *Attorney, Agent, or Firm* — Dickinson Wright RLLP

(57) ABSTRACT

A method for adaptively disabling receiver diversity is provided. The method can include a wireless communication device determining an active data traffic pattern; defining a threshold channel quality metric based at least in part on a threshold channel quality needed to support a threshold quality of service for the active data traffic pattern; comparing a measured channel quality to the threshold channel quality metric; and disabling receiver diversity in an instance in which the measured channel quality metric satisfies the threshold channel quality metric.

20 Claims, 6 Drawing Sheets

Related U.S. Application Data

(60) Provisional application No. 61/785,607, filed on Mar. 14, 2013.

(52) U.S. Cl.
CPC .......... *H04B 7/0871* (2013.01); *H04W 24/02* (2013.01); *H04W 52/0225* (2013.01); *Y02D 70/00* (2018.01); *Y02D 70/1262* (2018.01); *Y02D 70/1264* (2018.01); *Y02D 70/23* (2018.01); *Y02D 70/444* (2018.01)

(56) References Cited

U.S. PATENT DOCUMENTS

| | | | |
|---|---|---|---|
| 7,894,367 B2 | 2/2011 | Lin et al. | |
| 7,929,921 B2* | 4/2011 | Love | H04B 7/0814 375/148 |
| 8,046,657 B2 | 10/2011 | Johannesson et al. | |
| 8,160,648 B2* | 4/2012 | Ulupinar | H04B 7/0877 375/347 |
| 8,385,294 B2* | 2/2013 | Ben-Eli | H04B 7/0874 370/332 |
| 8,666,004 B2 | 3/2014 | Kim et al. | |
| 8,873,515 B2 | 10/2014 | Kastun et al. | |
| 2004/0253955 A1* | 12/2004 | Love | H04B 7/0814 455/442 |
| 2005/0197080 A1* | 9/2005 | Ulupinar | H04B 7/0877 455/135 |
| 2008/0059861 A1 | 3/2008 | Zhang | |
| 2008/0070509 A1 | 3/2008 | Kish | |
| 2008/0123615 A1* | 5/2008 | Hoshino | H04L 1/0026 370/343 |
| 2009/0111406 A1* | 4/2009 | Posti | H04B 7/0877 455/150.1 |
| 2009/0141661 A1 | 6/2009 | Li et al. | |
| 2009/0323541 A1 | 12/2009 | Sagfors et al. | |
| 2010/0120370 A1 | 5/2010 | Ishii | |
| 2010/0210235 A1 | 8/2010 | Ulupinar et al. | |
| 2011/0201295 A1 | 8/2011 | Ma et al. | |
| 2012/0099497 A1 | 4/2012 | Vaidya et al. | |
| 2012/0219040 A1* | 8/2012 | Valentine | H04B 7/0871 375/219 |
| 2012/0287815 A1 | 11/2012 | Attar | |
| 2013/0051258 A1* | 2/2013 | Huang | H04B 7/0693 370/252 |

FOREIGN PATENT DOCUMENTS

| | | |
|---|---|---|
| JP | 2004241829 A | 8/2004 |
| JP | 2007515850 A | 6/2007 |
| JP | 2012213142 A | 11/2012 |
| KR | 1020110010129 | 1/2011 |
| TW | 200931876 A | 7/2009 |
| TW | 201236407 A | 9/2012 |
| WO | WO2009142964 | 11/2009 |
| WO | WO2012138922 | 10/2012 |

OTHER PUBLICATIONS

Japanese Patent Application No. 2016-500122—Office Action dated Sep. 2, 2016.
Korean Patent Application No. 10-2015-7024947—Office Action dated Oct. 14, 2016.
Taiwanese Patent Application No. 102148028—Office Action dated Feb. 25, 2015.
PCT Application No. PCT/US20131074202—International Search Report and Written Opinion dated Feb. 24, 2014.
European Patent Application No. 13878911.0—Extended European Search Report dated Dec. 9, 2015.
Korean Patent Application No. 10-2015-7024947—Final Office Action dated Mar. 31, 2017.
Taiwanese Patent Application. No. 104136078—Office Action dated Dec. 23, 2016.
Chinese Application for Invention No. 201380074497.5—First Office Action dated Oct. 9, 2017.

* cited by examiner

ADAPTIVE USE OF RECEIVER DIVERSITY

CROSS-REFERENCE TO RELATED APPLICATIONS

This application is a continuation of U.S. application Ser. No. 13/900,197, filed May 22, 2013, now U.S. Pat. No. 9,226,175 issued Dec. 29, 2015, which claims the benefit of U.S. Provisional Patent Application No. 61/785,607, filed Mar. 14, 2013, both of which are incorporated by reference herein in their entireties.

FIELD OF THE DESCRIBED EMBODIMENTS

The described embodiments relate generally to wireless communications and more particularly to adaptive use of receiver diversity.

BACKGROUND

As radio access technologies (RATs) continue to evolve, efforts have been made to provide higher throughput for data transmitted via wireless networks. For example, some modern RATs, such as Long Term Evolution cellular RATs, are designed to provide high throughput to end user applications by using advanced physical layer techniques, such as receiver diversity techniques, including multiple-input and multiple-output (MIMO), adaptive modulation and coding scheme (MCS) techniques, and hybrid automatic repeat request (HARM) techniques.

While these advanced techniques satisfy goals of providing higher throughput for modern data intensive applications, even on mobile networks, usage of such techniques can significantly increase power consumption by a wireless communication device, thereby reducing battery life. In this regard, receiver diversity techniques utilize multiple receiver chains to support features like MIMO, which results in increased power consumption. As receiver diversity techniques implemented in modern RATs are generally always used by default, even in instances in which device usage characteristics at a given point in time do not require the higher throughput that can be provided through usage of receiver diversity techniques, device usage time between charges can be significantly reduced and user experience can be negatively impacted.

SUMMARY OF THE DESCRIBED EMBODIMENTS

Some example embodiments disclosed herein provide for adaptive use of receiver diversity. In this regard, some example embodiments reduce power consumption in wireless communication devices by adaptively disabling receiver diversity based on device usage characteristics such that receiver diversity can be disabled when not needed. In accordance with various example embodiments, receiver diversity can be selectively disabled based on a variety of device usage characteristics, including, for example, knowledge of an active data traffic pattern on the device; knowledge of an active application(s) and its data rate requirements (e.g., uplink and/or downlink requirements) for supporting a certain quality of service (QoS); physical layer measurements, such as measured signal to interference plus noise ratio (SINR), measured reference signal received power (RSRP), measured reference signal received quality (RSRQ), measured received signal strength indicator (RSSI), and/or the like; application layer measurements, such as measured round trip time (RTT), measured packet loss rate (PLR), and/or the like; or some combination thereof.

In a first embodiment, a method for adaptively disabling receiver diversity is provided. The method of the first embodiment can include a wireless communication device determining an active data traffic pattern; defining a threshold channel quality metric based at least in part on a threshold channel quality needed to support a threshold quality of service for the active data traffic pattern; comparing a measured channel quality to the threshold channel quality metric; and disabling receiver diversity in an instance in which the measured channel quality metric satisfies the threshold channel quality metric.

In a second embodiment, a wireless communication device is provided. The wireless communication device of the second embodiment can include a transceiver and processing circuitry coupled to the transceiver. The transceiver can be configured to transmit data and receive data via a wireless network. The processing circuitry can be configured to control the wireless communication device of the second embodiment to at least determine an active data traffic pattern; define a threshold channel quality metric based at least in part on a threshold channel quality needed to support a threshold quality of service for the active data traffic pattern; compare a measured channel quality to the threshold channel quality metric; and disable receiver diversity in an instance in which the measured channel quality metric satisfies the threshold channel quality metric.

In a third embodiment, a computer program product for adaptively disabling receiver diversity is provided. The computer program product of the third embodiment can include at least one non-transitory computer readable storage medium having program code stored thereon. The program code of the third embodiment can include program code for determining an active data traffic pattern; program code for defining a threshold channel quality metric based at least in part on a threshold channel quality needed to support a threshold quality of service for the active data traffic pattern; program code for comparing a measured channel quality to the threshold channel quality metric; and program code for disabling receiver diversity in an instance in which the measured channel quality metric satisfies the threshold channel quality metric.

In a fourth embodiment, an apparatus for adaptively disabling receiver diversity is provided. The apparatus of the fourth embodiment can include means for determining an active data traffic pattern; means for defining a threshold channel quality metric based at least in part on a threshold channel quality needed to support a threshold quality of service for the active data traffic pattern; means for comparing a measured channel quality to the threshold channel quality metric; and means for disabling receiver diversity in an instance in which the measured channel quality metric satisfies the threshold channel quality metric.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. Other embodiments, aspects, and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION OF SELECTED EMBODIMENTS

Figure 1:
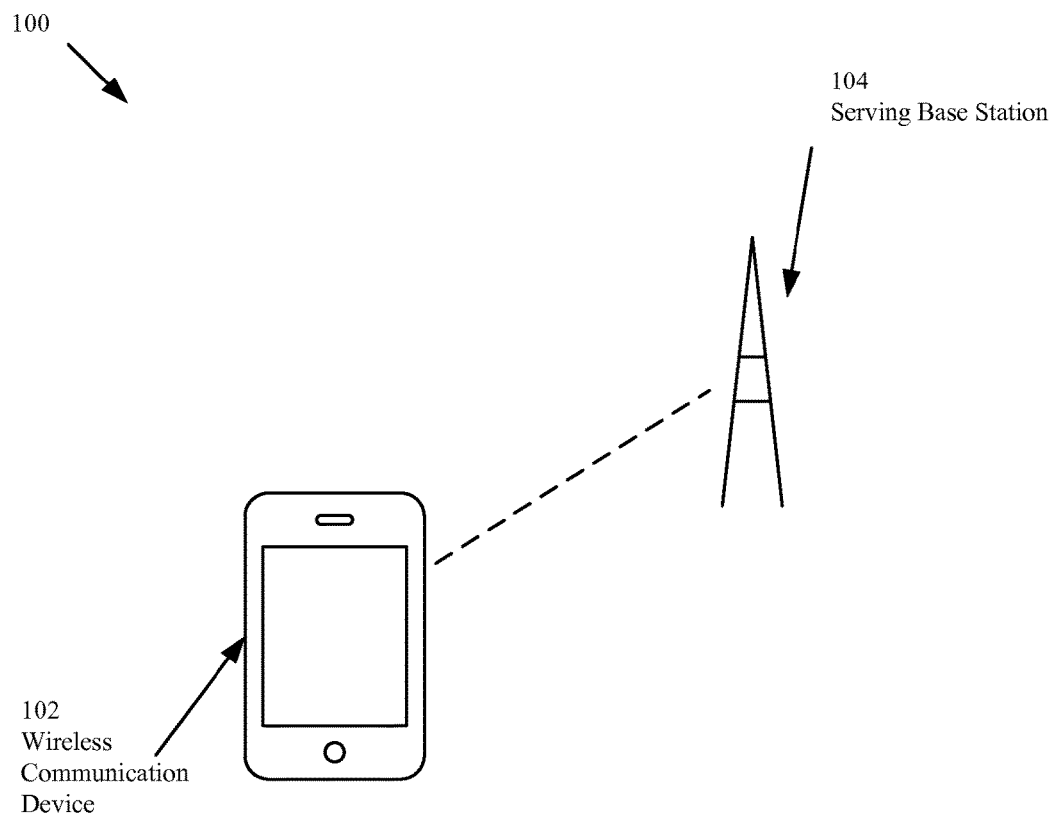
FIG. 1 illustrates a wireless communication system in accordance with some example embodiments.

Representative applications of the systems, methods, apparatuses, and computer program products disclosed herein are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Some example embodiments disclosed herein reduce power consumption in wireless communication devices by adaptively disabling receiver diversity based on device usage characteristics such that receiver diversity can be disabled when not needed. In accordance with various example embodiments, receiver diversity can be selectively disabled based on a variety of device usage characteristics, including, for example, knowledge of an active data traffic pattern on the device; knowledge of an active application(s) and its data rate requirements (e.g., uplink and/or downlink requirements) for supporting a certain quality of service (QoS); physical layer measurements, such as measured signal to interference plus noise ratio (SINR), measured reference signal received power (RSRP), measured reference signal received quality (RSRQ), measured received signal strength indicator (RSSI), and/or the like; application layer measurements, such as measured round trip time (RTT), measured packet loss rate (PLR), and/or the like; or some combination thereof.

More particularly, some example embodiments define a threshold(s) for disabling and/or enabling receiver diversity such that receiver diversity can be selectively enabled and disabled based on measured channel metrics, such as measured physical layer metrics (e.g., SINR, RSRP, RSRQ, RSSI, and/or the like), and/or measured application layer metrics (e.g., RTT, PLR, and/or the like). The threshold of some example embodiments can be defined based at least in part on a threshold channel quality that can be needed to support a threshold QoS for a given active data traffic pattern. Thus, for example, if data traffic is inactive or an application is being used that does not require high throughput, receiver diversity can be disabled to conserve power. In this regard, the higher level of throughput that can be provided through usage of receiver diversity may not be needed to support some data traffic patterns. For example, video conferencing applications, such as Apple® FaceTime®, voice over LTE (VoLTE), and other applications using a relatively low fixed traffic rate can function quite reliably at lower throughputs such that receiver diversity can often be disabled when using such applications without impacting application functionality or user experience. Thus, for example, while the LTE standard is designed to operate with two receiver chains to support MIMO and robust Single Layer transmissions, some example embodiments provide for turning off the secondary receiver chain to reduce power consumption in instances in which so doing will not incur a performance penalty. Users can accordingly benefit through increased battery life without any noticeable impact from reduced application functionality or responsiveness.

FIG. 1 illustrates a wireless communication system 100 in which some example embodiments can be applied. In this regard, FIG. 1 illustrates a wireless cellular access network including a wireless communication device 102 and a serving base station 104, which can provide network access to the wireless communication device 102 via a radio link. By way of non-limiting example, the wireless communication device 102 can be a cellular phone, such as a smart phone device, a tablet computing device, a laptop computing device, or other computing device configured to access a cellular and/or other wireless network via a serving base station 104. The serving base station 104 can be any cellular base station, such as an evolved node B (eNB), node B, base transceiver station (BTS), and/or any other type of base station.

The wireless access network of the system 100 can implement any RAT that can support usage of receiver diversity techniques, including, by way of non-limiting example, an LTE RAT, such as LTE, LTE-Advanced (LTE-A), and/or other LTE RAT. It will be appreciated, however, that the embodiments disclosed herein are not limited to application within LTE systems, and can be applied to any cellular RAT utilizing MIMO and/or other receiver diversity techniques. Further, it will be appreciated that some example embodiments can be applied to non-cellular wireless RATs in which receiver diversity techniques can be applied. Thus, for example, it will be appreciated that a wireless network access point in accordance with any such RAT can be substituted for the serving base station 104 within the scope of the disclosure. Further, it will be appreciated that where various embodiments are discussed by way of example as being applied to LTE and/or other cellular RAT, such examples are provided as non-limiting examples of the applications of some example embodiments and the techniques can be applied to another RAT using receiver diversity techniques within the scope of the disclosure.

Figure 2:
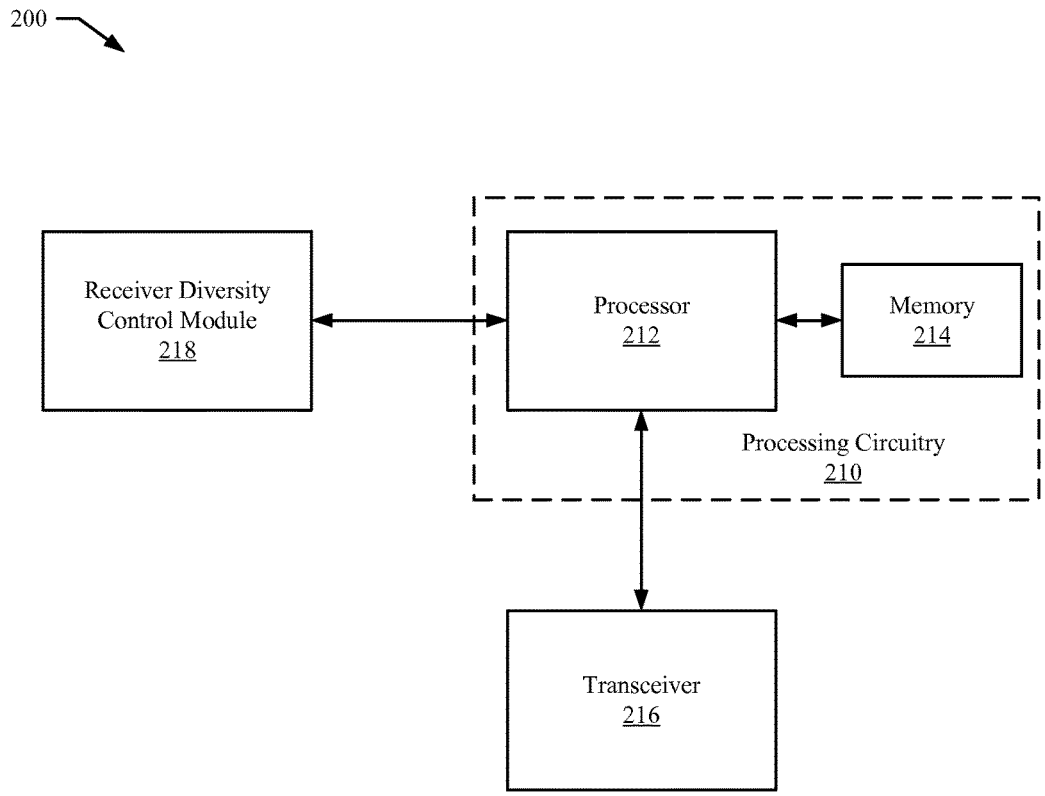
FIG. 2 illustrates a block diagram of an apparatus that can be implemented on a wireless communication device in accordance with some example embodiments.

FIG. 2 illustrates a block diagram of an apparatus 200 that can be implemented on a wireless communication device 102, in accordance with some example embodiments. In this regard, when implemented on a computing device, such as wireless communication device 102, apparatus 200 can enable the computing device to implement adaptive receiver diversity techniques in accordance with one or more example embodiments within a wireless communication system, such as the system 100. It will be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some example embodiments, the apparatus 200 can include processing circuitry 210 that is configurable to perform actions in accordance with one or more example embodiments disclosed herein. In this regard, the processing circuitry 210 can be configured to perform and/or control performance of one or more functionalities of the apparatus 200 in accordance with various example embodiments, and thus can provide means for performing functionalities of the apparatus 200 in accordance with various example embodiments. The processing circuitry 210 can be configured to perform data processing, application execution and/or other processing and management services according to one or more example embodiments.

In some embodiments, the apparatus 200 or a portion(s) or component(s) thereof, such as the processing circuitry 210, can include one or more chipsets, which can each include one or more chips. The processing circuitry 210 and/or one or more further components of the apparatus 200 can therefore, in some instances, be configured to implement an embodiment on a chipset. In some example embodiments in which one or more components of the apparatus 200 are embodied as a chipset, the chipset can be capable of enabling a computing device to operate in the system 100 when implemented on or otherwise operably coupled to the computing device. In some example embodiments, the apparatus 200 can include a cellular chipset, which can be configured to enable a computing device, such as wireless communication device 102, to operate on a cellular network.

In some example embodiments, the processing circuitry 210 can include a processor 212 and, in some embodiments, such as that illustrated in FIG. 2, can further include memory 214. The processing circuitry 210 can be in communication with or otherwise control a transceiver 216 and/or receiver diversity control module 218.

The processor 212 can be embodied in a variety of forms. For example, the processor 212 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. The plurality of processors can be in operative communication with each other and can be collectively configured to perform one or more functionalities of the apparatus 200 as described herein. In some example embodiments, the processor 212 can be configured to execute instructions that can be stored in the memory 214 or that can be otherwise accessible to the processor 212. As such, whether configured by hardware or by a combination of hardware and software, the processor 212 capable of performing operations according to various embodiments while configured accordingly.

In some example embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions and/or the like for enabling the apparatus 200 to carry out various functions in accordance with one or more example embodiments. In some embodiments, the memory 214 can be in communication with one or more of the processor 212, transceiver 216, or receiver diversity control module 218 via a bus(es) for passing information among components of the apparatus 200.

The apparatus 200 can further include transceiver 216. The transceiver 216 can enable the apparatus 200 to send wireless signals to and receive signals from one or more wireless networks. Thus, for example, when implemented on wireless communication device 102, the transceiver 216 can be configured to support establishment of and communication via a radio link with another device, such as the serving base station 104 and/or other wireless network access point. In this regard, the transceiver 216 can be configured to support communication in accordance with any RAT that can use a receiver diversity technique. In some example embodiments, the transceiver 216 can include and/or be coupled to hardware configured to support receiver diversity techniques. For example, the transceiver 216 of some example embodiments can include and/or be coupled to a plurality of antennas that can be used to support receiver diversity techniques, such as MIMO.

The apparatus 200 can further include receiver diversity control module 218. The receiver diversity control module 218 can be embodied as various means, such as circuitry, hardware, a computer program product comprising computer readable program instructions stored on a computer readable medium (for example, the memory 214) and executed by a processing device (for example, the processor 212), or some combination thereof. In some embodiments, the processor 212 (or the processing circuitry 210) can include, or otherwise control the receiver diversity control module 218. The receiver diversity control module 218 can be configured to adaptively enable and/or disable receiver diversity in accordance with one or more example embodiments, as described further herein below.

A throughput that may be needed by the wireless communication device 102 at a given time can be determined based on an active data traffic pattern. The active data traffic pattern can, for example, be defined in terms of a data rate at which data is being received and/or sent by the wireless communication device 102, a frequency with which data is being received and/or sent by the wireless communication device 102, and/or other metrics that can describe a data traffic pattern. The active data traffic pattern can be driven by an application(s) that may be in use at a given time. In this regard, a given application can have an associated application traffic pattern, which can be defined in terms of packet size, packet inter-arrival time, and the like. For example, VoLTE can have a traffic pattern that can be defined as follows:

|  | VoLTE |
| --- | --- |
| Packet Size | ~31 bytes |
| Packet Inter-Arrival Time | 20 (ms) Deterministic |

The QoS that can be needed by an application can, for example, be measured in terms of packet delay and PLR. For example, VoLTE or other video/voice application that can be transmitted over an LTE air interface can have an associated QoS that can be defined as follows:

| Packet Delay | 150 ms one-trip delay |
| --- | --- |
| Packet Loss Rate | ~1% |

In cellular communication systems, a scheduler can be implemented on the serving base station 104, which can schedule application traffic. For example, in LTE systems, an eNB scheduler can schedule application traffic. Given an application layer packet size of m bytes arriving at the base station input buffer, the scheduler can determine the physical layer resources to be allocated to the packet. The scheduler can determine the transport block (TB) size allocation (after any protocol overhead addition) based on any of a variety of factors, including a channel quality indicator (CQI) that can be reported by the wireless communication device 102, a rank that can be reported by the wireless communication device 102, traffic scheduled for any other devices with active data transfer, and/or the like. Based on these factors, the scheduler can determine a modulation and coding scheme (MCS) and resource block (RB) allocation for the wireless communication device 102 for a given transmission time interval (TTI). In high loading scenarios, the radio link control (RLC) may need to segment a packet for transmission over multiple TTIs. In this regard, a large degree of segmentation can be indicative of a high loading scenario for serving base station 104.

Based on the foregoing, a criterion to disable receiver diversity can be defined in accordance with some example embodiments. In some example embodiments, a criterion for disabling receiver diversity can be defined in terms of a QoS for an active application (e.g., for a data traffic pattern associated with the application) and/or in terms of an observed active data traffic pattern. In this regard, from a user perspective, it can be acceptable to disable receiver diversity and cease usage of a secondary receiver chain if a QoS (e.g., a threshold QoS) can be satisfied for a given application. As such, the receiver diversity control module 218 of some example embodiments can be configured to define a threshold channel quality corresponding to a physical layer measurement(s) sufficient to sustain an acceptable packet loss after PHY/RLC retransmissions based on radio frequency (RF) channel conditions. In this regard, one of the main inputs in the base station scheduler determining transport block size is the CQI and Rank that can be independently controlled and reported by the wireless communication device 102. As such, the receiver diversity control module 218 of some example embodiments can be configured to determine based on measured RF channel conditions whether a reasonable (e.g. at least a minimum threshold) CQI can be sustained with a single receiver chain, even though the Rank can be reduced to 1 when disabling receiver diversity. The reasonable CQI can correspond to a minimum threshold CQI that can allow an application packet to be received reliably at a corresponding MCS without creating excessive load on the serving base station 104.

One way of predicting channel quality is by measuring SINR. Thus, for example, the receiver diversity control module 218 of some example embodiments can be configured to define a threshold SINR in terms of a threshold SINR level that may be needed to sustain a required CQI on a single receiver chain. Receiver diversity can be disabled in accordance with some example embodiments if a measured SINR satisfies the threshold SINR. Thus, for example, a criterion for disabling receiver diversity in accordance with some example embodiments can be defined as follows:

$$SINR_0 \geq SINR_{rxd\_disable},$$

where $SINR_0$ represents a measured SINR and $SINR_{rxd\_disable}$ defines a threshold SINR for disabling receiver diversity.

It will be appreciated that the receiver diversity control module 218 of some example embodiments can define a threshold criterion in terms of other physical layer measurements in addition to or as an alternative to SINR. For example, some example embodiments can use RSRP, RSRQ, RSSI, and/or the like to augment a criterion for disabling receiver diversity.

As a further example, in some example embodiments, the receiver diversity control module 218 can be configured to utilize a physical layer measure of cyclic redundancy check (CRC) failures for one or more transport blocks to define and/or otherwise enhance a threshold criterion for disabling receiver diversity. For example, in some embodiments, if no CRC failures have occurred on the nth HARQ retransmission, then receiver diversity can be disabled. However, in some such example embodiments, a more relaxed (e.g., lower) SINR threshold, or other threshold channel quality metric, can still be applied to provide for reliable receiver performance with receiver diversity disabled.

The receiver diversity control module 218 of some example embodiments can be additionally or alternatively configured to take into account application layer measurements when defining a threshold channel quality metric and/or to augment a threshold channel quality metric for disabling receiver diversity. For example, in some embodiments, an application can estimate one-trip delay, such as by using ping packets to get round trip time (RTT). If the measured RTT satisfies (e.g., is below) a threshold RTT, then the receiver diversity control module 218 can be configured to disable receiver diversity. If, however, the measured RTT is large and fails to satisfy (e.g., exceeds) the threshold RTT, the receiver diversity control module 218 of some example embodiments can be configured to enable receiver diversity, even if a physical layer measurement threshold, such as a threshold SINR, for disabling receiver diversity is satisfied.

As another example, in some embodiments, an application can estimate PLR. If measured PLR satisfies (e.g., is below) a threshold PLR, the receiver diversity control module 218 of some example embodiments can be configured to disable receiver diversity. If, however, the measured PLR is high and fails to satisfy (e.g., exceeds) the threshold PLR, the receiver diversity control module 218 of some such example embodiments can be configured to enable receiver diversity, even if a physical layer measurement threshold, such as a threshold SINR, for disabling receiver diversity is satisfied.

Application layer QoS measurements, such as RTT and PLR can provide an indication of loading on the serving base station 104. Thus, for example, if RTT and/or PLR are increasing, it can be better for the wireless communication device 102 to report and decode at a higher MCS and Rank to alleviate the loading by reducing the wireless communication device's share of RB allocation. As such, in some example embodiments, the receiver diversity control module 218 can be configured to define a threshold channel quality metric and/or augment a threshold channel quality metric based on a measured indication of loading on the serving base station 104, such as measured RTT, PLR, and/or the like.

Some example embodiments can similarly define physical layer and/or application layer criteria for enabling receiver diversity, which can be enforced by the receiver diversity control module 218. For example, if measured SINR drops below a threshold under which CQI can impact minimum required throughput for an active data traffic pattern, then the receiver diversity control module 218 can be configured to enable receiver diversity. Thus, for example, a criterion for enabling receiver diversity in accordance with some example embodiments can be defined as follows:

$$SINR_0 \leq SINR_{rxd\_enable},$$

where $SINR_0$ represents a measured SINR and $SINR_{rxd\_enable}$ defines a threshold SINR for enabling receiver diversity. In some example embodiments, $SINR_{rxd\_enable}$ can be a different value than $SINR_{rxd\_disable}$ so as to avoid a hysteresis effect. For example, $SINR_{rxd\_enable}$ can be lower than $SINR_{rxd\_disable}$. It will be appreciated, however, that in some example embodiments, a single threshold (e.g., $SINR_{threshold}$) can be defined and receiver diversity can be enabled/disabled based on whether a measured SINR satisfies the threshold.

As a further example, if any, or, alternatively, a threshold number of, CRC failures have occurred on the nth HARQ retransmission, then the receiver diversity control module 218 can be configured to enable receiver diversity in some example embodiments.

Any of a variety of application layer measurements can additionally or alternatively be factored by the receiver diversity control module 218 in determining whether to enable receiver diversity. For example, if measured RTT exceeds a threshold RTT, then receiver diversity can be enabled. As another example, if measured PLR exceeds a threshold PLR, then receiver diversity can be enabled.

The receiver diversity control module 218 of some example embodiments can be configured to adaptively define a threshold channel quality metric based on loading on the serving base station 104. For example, in some embodiments, an adaptive SINR threshold can be defined and enforced by the receiver diversity control module 218. However, it will be appreciated that other adaptive threshold channel quality metrics, such as adaptive threshold RSRP, RSRQ, RSSI, and/or the like can additionally or alternatively be defined and enforced within the scope of the disclosure. Thus, it will be appreciated that the ensuing examples of defining an adaptive threshold SINR are provided by way of example, and not by way of limitation. In this regard, similar techniques can be applied for defining other adaptive threshold channel quality metrics.

The main resource in control of the serving base station 104 is the RB allocation to different devices, as the CQI which determines the MCS can be controlled by the wireless communication device 102 and the active data traffic pattern can be determined by the application(s) in use. If the diversity control module 218 defines an aggressive SINR threshold, (e.g., a lower SINR threshold) to disable receiver diversity, then the wireless communication device 102 may report lower CQIs to the network if the RF conditions deteriorate. In order to facilitate packet transmission, the serving base station 102 may need to use a large number of RBs. In high loading scenarios, usage of a large number of RBs may increase the packet delay since the wireless communication device 102 may not be allocated the needed number of RBs right away. On the other hand, when the loading is low, even with low CQI, the serving base station 104 may be able to allocate more RBs to the wireless communication device 102 and an increase in packet delay can be avoided.

As such, the receiver diversity control module 218 of some example embodiments can be configured to adaptively modify SINR thresholds for enabling/disabling receiver diversity based on loading on the serving base station 104. By way of non-limiting example, in some example embodiments, the receiver diversity control module 218 can modify the SINR threshold based at least in part on a monitored application layer QoS measure. For example, if the RTT starts increasing, the corresponding $SINR_{rxd\_disable}$ threshold can be increased and/or $SINR_{rxd\_enable}$ threshold can be decreased. By way of non-limiting example, the receiver diversity control module 218 of some embodiments can be configured to adaptively define a threshold SINR based at least in part on application layer measurements indicative of loading on the serving base station 104 as follows:

If $RTT_{meas} \geq RTT_{high\_thres}, SINR_{rxd\_disable} = \min(\alpha SINR_{rxd\_disable}, SINR_{max})$;

If $RTT_{meas} \leq RTT_{low\_thres}, SINR_{rxd\_enable} = \max(\beta SINR_{rxd\_enable}, SINR_{min})$;

$\alpha > 1, \beta < 1$

In some example embodiments, the receiver diversity control module 218 can be configured to use RLC segmentation of an application packet to determine loading on the serving base station 104 in addition to or in alternative to usage of RTT and PLR measurements. In most fixed low rate data traffic, an entire packet should fit within a single PHY transport block. However, when the loading increases and the number of RBs allocated to the wireless communication device 102 is not sufficient to deliver an entire packet, the serving base station 102 can perform RLC segmentation to deliver the packet over multiple retransmissions. Hence, in some example embodiments, the receiver diversity control module 218 can be configured to adaptively modify the threshold SINR based at least in part on observed RLC segmentation. As a non-limiting example, $SINR_{rxd\_disable}$ can be increased and/or $SINR_{rxd\_enable}$ can be decreased by some margin in response to detection of RLC segmentation. For example, in some example embodiments, $SINR_{rxd\_disable}$ can be increased and/or $SINR_{rxd\_enable}$ can be decreased by some margin every-time RLC segmentation is detected. Further, in some example embodiments, after detecting a threshold number of non-segmented packets, the receiver diversity control module 218 can be configured to adjust an SINR threshold, such as by decreasing $SINR_{rxd\_disable}$ and/or increasing $SINR_{rxd\_enable}$ by some margin.

In the foregoing examples, $SINR_{rxd\_enable}$ can be a different value than $SINR_{rxd\_disable}$ so as to avoid a hysteresis effect. For example, $SINR_{rxd\_enable}$ can be lower than $SINR_{rxd\_disable}$. It will be appreciated, however, that in some example embodiments, a single threshold (e.g., $SINR_{threshold}$) can instead be defined and adaptively modified, with receiver diversity being enabled/disabled based on whether a measured SINR satisfies the threshold.

It will be appreciated that any indication of loading on the serving base station 104 that can be measured or otherwise observed by the wireless communication device 102 can be used for adaptively defining and/or modifying SINR and/or other channel quality thresholds for enabling/disabling receiver diversity. In this regard, the above examples using application layer QoS measurements, such as RTT, and observed RLC segmentation are provided by way of example, and not by way of limitation. Other indications of loading on the serving base station 104 can be used in addition to or in lieu of application layer QoS measurements and/or RLC segmentation in accordance with some example embodiments.

In some example embodiments in which the receiver diversity control module 218 can be configured to define a threshold channel quality metric, such as a threshold SINR, adaptively and/or otherwise based on multiple measurements that can be indicative of channel quality, such as one or more physical layer measurements and/or one or more application layer measurements, the receiver diversity control module 218 can be configured to apply weighting to the factors that can be taken into account. For example, some measurements can be weighted to be more influential than others when defining a threshold channel quality metric.

In some example embodiments, the receiver diversity control module 218 can be configured to apply a threshold for adaptively disabling/enabling receiver diversity based on a measured channel quality only in an instance in which a certain threshold gateway data traffic pattern is observed. For example, in some embodiments, receiver diversity can remain enabled without any application of a threshold channel quality metric for adaptive disabling of receiver diversity unless a gateway threshold, such as a scheduling rate below a threshold, a data rate below a threshold, and/or the like are satisfied.

Figure 3:
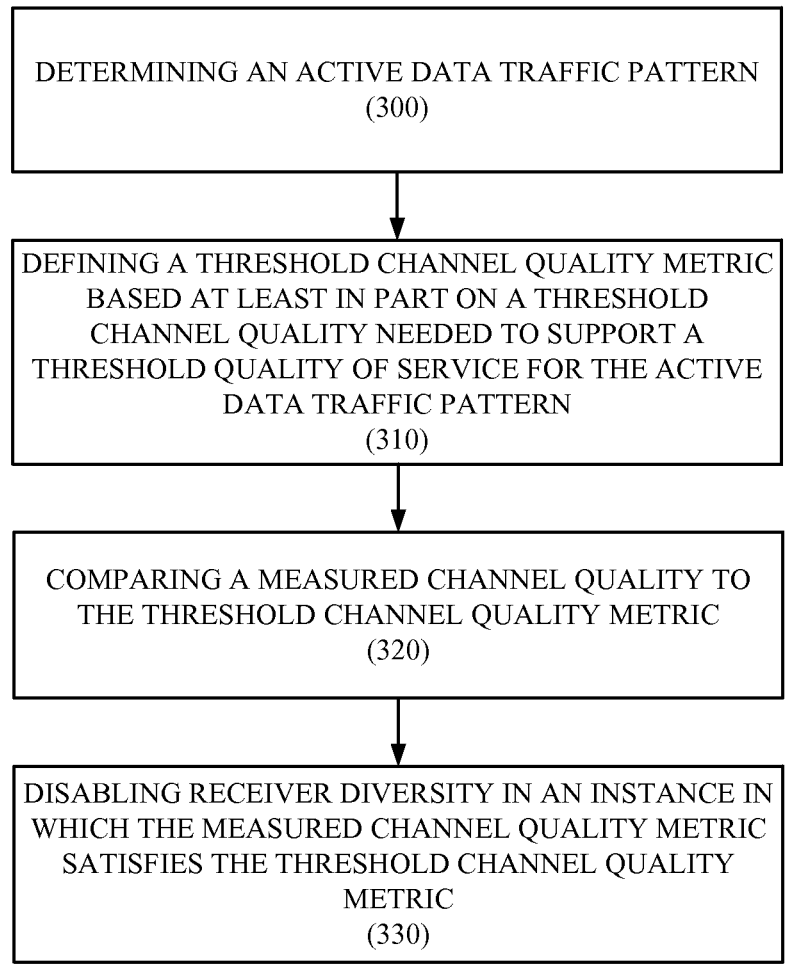
FIG. 3 illustrates a flow chart according to an example method for adaptively disabling receiver diversity in accordance with some example embodiments.

FIG. 3 illustrates a flow chart according to an example method for adaptively disabling receiver diversity in accordance with some example embodiments. In this regard, FIG. 3 illustrates a method that can be performed by wireless communication device 102. One or more of processing circuitry 210, processor 212, memory 214, transceiver 216, or receiver diversity control module 218 can, for example, provide means for performing the operations illustrated in and described with respect to FIG. 3.

Operation 300 can include the wireless communication device 102 determining an active data traffic pattern on the wireless communication device 102. In some example embodiments, operation 300 can include observing data traffic that can be sent and/or received by the wireless communication device 102 in order to determine the active data traffic pattern. Additionally or alternatively, operation 300 can include determining an active application(s) on the wireless communication device 102 and determining a data traffic pattern associated with the active application(s). As a further example, in some example embodiments, the application layer can inform a lower layer, such as the physical layer of an active data traffic pattern observable by and/or otherwise known to the application layer.

Operation 310 can include the wireless communication device 102 defining threshold channel quality metric based at least in part on a threshold channel quality needed to support a threshold QoS for the active data traffic pattern. For example, operation 310 can include defining the threshold channel quality metric based at least in part on a channel quality required to sustain at least a minimum CQI required to support the threshold QoS for the active data traffic pattern. In some example embodiments, the threshold channel quality metric can be a threshold SINR.

The threshold QoS based upon which the threshold channel quality metric can be defined in operation 310 can, for example, be defined based at least in part on a minimum channel quality sufficient to sustain an acceptable packet loss rate and/or throughput a given data traffic pattern. In some example embodiments, the threshold QoS can, for example, be defined in terms of an acceptable packet delay (e.g., an acceptable one-trip delay, RTT, and/or the like), an acceptable packet loss rate, a minimum acceptable throughput, and or the like for an active data traffic pattern.

In some example embodiments in which the threshold channel quality metric can be adaptively defined, the threshold channel quality metric can be defined further based on a measured indication of loading on a serving base station. For example, the threshold channel quality metric can be defined and/or otherwise modified based at least in part on an application layer measurement, such as a measured RTT, measured PLR, and/or the like. As another example, the threshold channel quality metric can be defined and/or otherwise modified by an amount of RLC segmentation that may be observed.

Operation 320 can include the wireless communication device 102 comparing a measured channel quality to the threshold channel quality metric. Operation 330 can include the wireless communication device 330 disabling receiver diversity in an instance in which the measured channel quality metric satisfies the threshold channel quality metric. For example, in embodiments in which the threshold channel quality metric is a threshold SINR, receiver diversity can be disabled in an instance in which measured SINR exceeds the threshold SINR.

In some example embodiments, application layer threshold measurements can be defined to override operation 330. In this regard, in some embodiments, operation 330 can be omitted and/or receiver diversity can be re-enabled, if disabled, in an instance in which a measured application layer measurement fails to satisfy a threshold application layer measurement. For example, in some example embodiments, receiver diversity can be enabled in an instance in which a measured RTT is greater than a threshold RTT, even if the threshold channel quality metric is satisfied by a measured channel quality. As another example, in some embodiments, receiver diversity can be enabled in an instance in which a measured PLR is greater than a threshold PLR, even if the threshold channel quality metric is satisfied by a measured channel quality.

In some example embodiments, multiple threshold channel quality metrics can be defined. In this regard, a first threshold channel quality metric can be defined for disabling receiver diversity and a second threshold channel quality metric can be defined for enabling receiver diversity. Thus, for example, if after performance of operation 330 a subsequent measured channel quality fails to satisfy (e.g., is less than in some embodiments in which a measured SINR can be compared to a threshold SINR) the threshold channel quality metric for enabling receiver diversity, receiver diversity can be re-enabled. The threshold channel quality metric for enabling receiver diversity can be different than the threshold channel quality metric for disabling receiver diversity so as to avoid a hysteresis effect. For example, a threshold SINR for enabling receiver diversity can be lower than a threshold SINR for disabling receiver diversity so as to avoid a hysteresis effect. However, it will be appreciated that some example embodiments can instead use a single threshold value and receiver diversity can be enabled/disabled based on the threshold.

In some example embodiments, one or more of operations 310-330 can be omitted if a threshold gating condition is not satisfied. For example, if a threshold gateway data traffic pattern is not observed in operation 300, then operation 310 and/or operation 320 can be omitted in some example embodiments. In this regard, in some embodiments, receiver diversity can remain enabled without any application of a threshold channel quality metric for adaptive disabling of receiver diversity unless a gateway data traffic pattern threshold, such as a scheduling rate below a threshold, a data rate below a threshold, and/or the like are satisfied.

Figure 4:
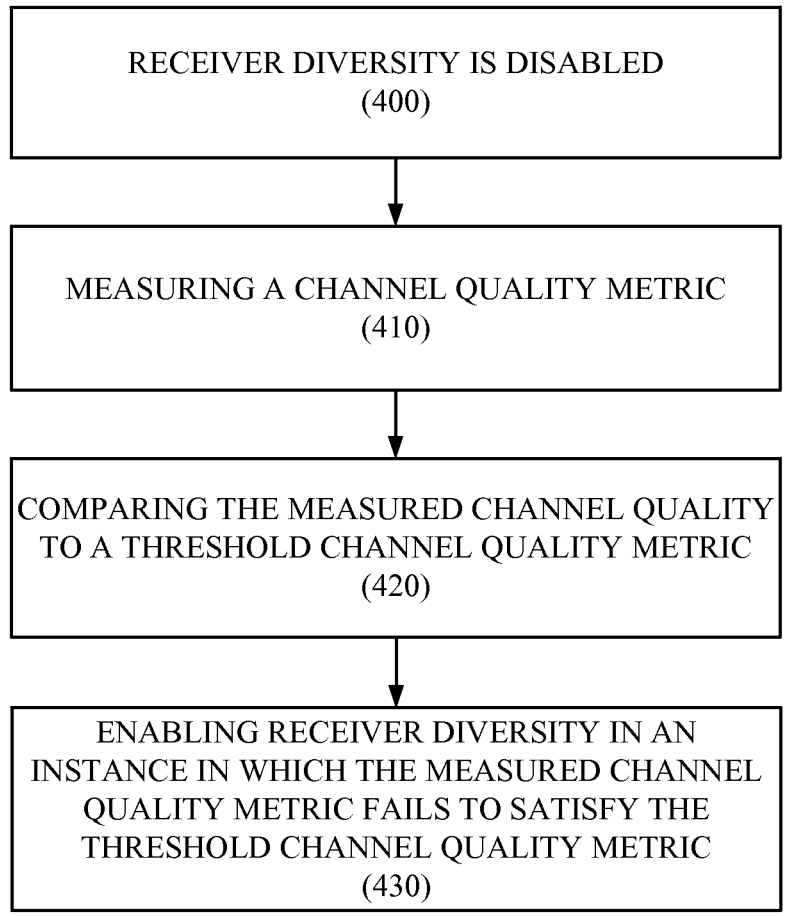
FIG. 4 illustrates a flow chart according to an example method for adaptively enabling receiver diversity in accordance with some example embodiments.

FIG. 4 illustrates a flow chart according to an example method for adaptively enabling receiver diversity in accordance with some example embodiments. In this regard, FIG. 4 illustrates a method that can be performed by wireless communication device 102. One or more of processing circuitry 210, processor 212, memory 214, transceiver 216, or receiver diversity control module 218 can, for example, provide means for performing the operations illustrated in and described with respect to FIG. 4.

With reference to FIG. 4, at an initial state 400, receiver diversity can be disabled. For example, state 400 may follow disabling receiver diversity in operation 330. Operation 410 can include the wireless communication device 102 measuring a channel quality metric. The measured channel quality metric can, for example, be a SINR, a measured packet delay (e.g., a measured RTT, a measured one-trip delay, and/or the like), a measured PLR, a measured throughput, and/or the like.

Operation 420 can include the wireless communication device 102 comparing the measured channel quality metric to a threshold channel quality metric. The threshold channel quality metric can be a metric corresponding to the measured channel quality metric. For example, in embodiments in which the measured channel quality metric is a measured SINR, the threshold channel quality metric can be a threshold SINR.

The threshold channel quality metric can be defined based at least in part and/or otherwise correspond to an active data traffic pattern. In some example embodiments, the threshold channel quality metric that can be evaluated in operation 420 for enabling receiver diversity can be the same as a threshold channel quality metric that can be applied for disabling receiver diversity, such as in operation 320. Alternatively, in some example embodiments, the threshold channel quality metric that can be evaluated in operation 420 for enabling receiver diversity can have a different value than a threshold channel quality metric that can be applied for disabling receiver diversity so as to avoid a hysteresis effect. For example, in some embodiments in which the threshold channel quality metric that can be evaluated in operation 420 for enabling receiver diversity is a threshold SINR, the threshold SINR can have a lower value than a threshold SINR that can be applied for disabling receiver diversity.

Operation 430 can include the wireless communication device 102 enabling receiver diversity in an instance in which the measured channel quality metric fails to satisfy the threshold channel quality metric. In some example embodiments, the wireless communication device 102 can return to one of operations 300, 310, or 320 and perform the method illustrated and described with respect to FIG. 3 following enablement of receiver diversity in operation 430. In this regard that receiver diversity can be adaptively enabled and disabled on an ongoing basis in some example embodiments in response to changing channel conditions and/or changing data traffic patterns.

Figure 5:
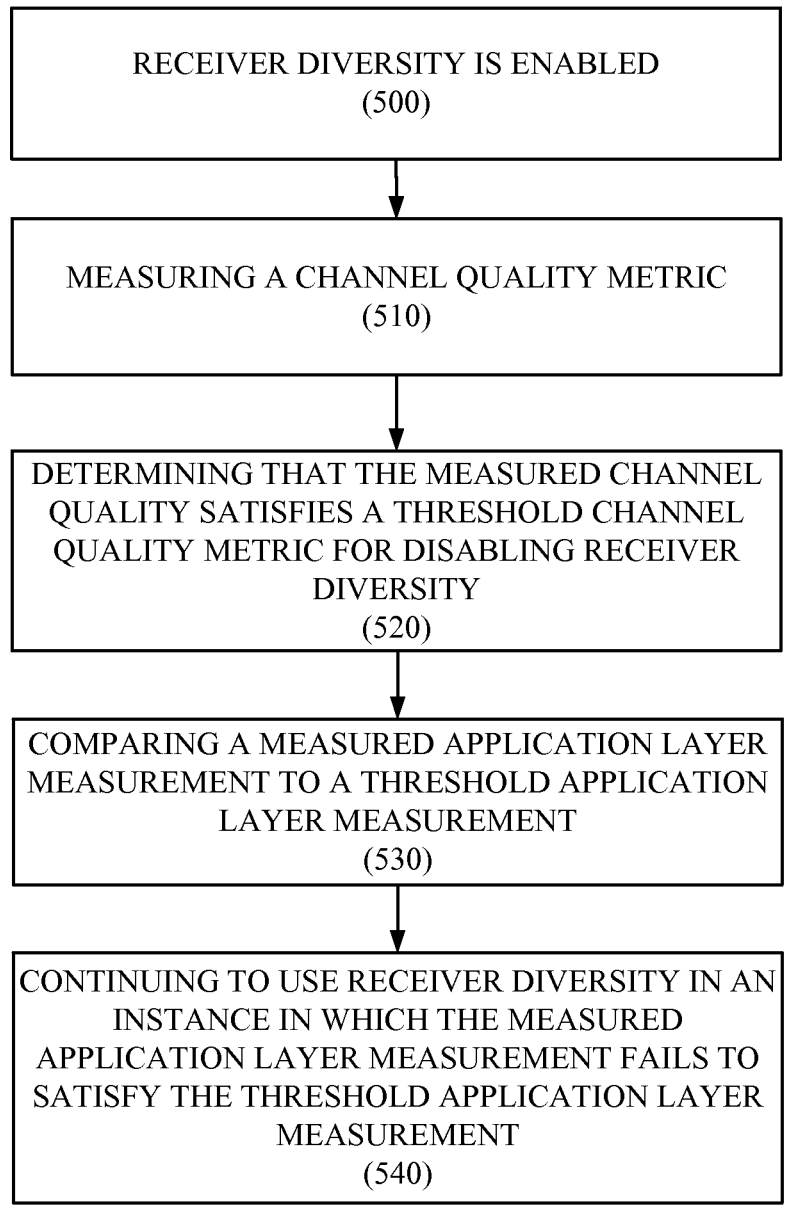
FIG. 5 illustrates a flow chart according to another example method for adaptively disabling receiver diversity in accordance with some example embodiments.

FIG. 5 illustrates a flow chart according to another example method for adaptively disabling receiver diversity in accordance with some example embodiments. In this regard, FIG. 5 illustrates a method in accordance with some example embodiments disablement of receiver diversity based on a physical layer threshold channel quality can be overridden based on an application layer measurement. The operations illustrated in and described with respect to FIG. 5 can be performed by wireless communication device 102. One or more of processing circuitry 210, processor 212, memory 214, transceiver 216, or receiver diversity control module 218 can, for example, provide means for performing the operations illustrated in and described with respect to FIG. 5.

With reference to FIG. 5, at an initial state 500, receiver diversity can be enabled. Operation 510 can include the wireless communication device 102 measuring a channel quality metric. The measured channel quality metric can, for example, be a measured SINR or other channel quality metric that can be measured and/or otherwise observed at the physical layer. Operation 520 can include the wireless communication device 102 determining that the measured channel quality satisfies a threshold channel quality metric for disabling receiver diversity. For example, if the measured channel quality metric is a measured SINR, operation 520 can include the wireless communication device 102 determining that the measured SINR exceeds a threshold SINR.

Operation 530 can include the wireless communication device 102 comparing a measured application layer measurement to a threshold application layer measurement. The measured application layer measurement can, for example, be an indication of a realized QoS that can be measured and/or otherwise observed at the application layer. For example, the measured application layer measurement can be a measured RTT, a measured PLR, and/or the like.

Operation 540 can include the wireless communication device 102 continuing to use receiver diversity (e.g., leaving receiver diversity enabled) in an instance in which the measured application layer measurement fails to satisfy the threshold application layer measurement. Thus, for example, receiver diversity can remain enabled if a measured RTT is greater than a threshold RTT, if a measured PLR exceeds a threshold PLR, and/or the like. If, however, the measured application layer measurement does satisfy the threshold application layer measurement, receiver diversity can be disabled. In this regard, in such example embodiments, an application layer criterion can be applied and can override a physical layer criterion for disabling receiver diversity if a QoS observed at the application layer does not satisfy the application layer criterion.

Figure 6:
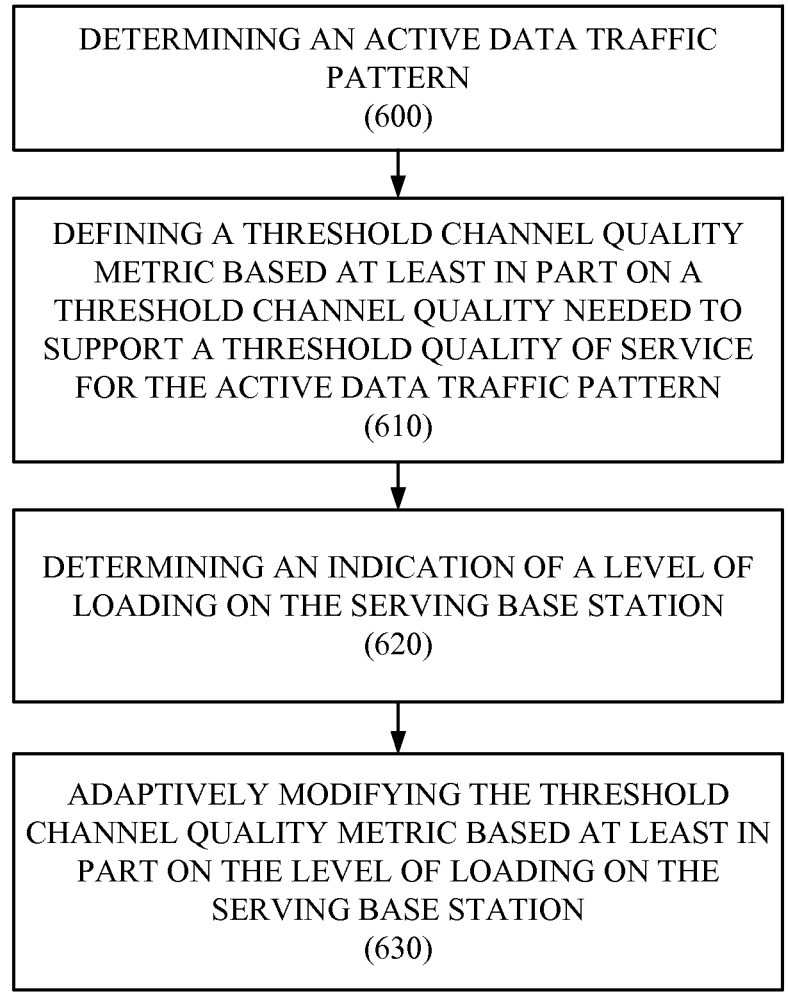
FIG. 6 illustrates a flow chart according to another example method for adaptively defining a threshold channel quality metric in accordance with some example embodiments.

FIG. 6 illustrates a flow chart according to another example method for adaptively defining a threshold channel quality metric in accordance with some example embodiments. In this regard, FIG. 6 illustrates a method that can be performed by wireless communication device 102. One or more of processing circuitry 210, processor 212, memory 214, transceiver 216, or receiver diversity control module 218 can, for example, provide means for performing the operations illustrated in and described with respect to FIG. 6.

Operation 600 can include the wireless communication device 102 determining an active data traffic pattern. Operation 600 can, for example, correspond to operation 300, as illustrated in and described with respect to FIG. 3. Operation 610 can include the wireless communication device 102 defining a threshold channel quality metric based at least in part on a threshold channel quality needed to support a threshold quality of service for the active data traffic pattern. The threshold channel quality metric can include a threshold channel quality metric for disabling receiver diversity and/or a threshold channel quality metric for enabling receiver diversity. In this regard, operation 610 can correspond to operation 310, as illustrated in and described with respect to FIG. 3.

Operation 620 can include the wireless communication device 102 determining an indication of loading on the serving base station 104. The indication of loading on the serving base station 104 can be any indication of loading that can be measured or otherwise observed by the wireless communication device 102. For example, in some example embodiments, operation 620 can include the wireless communication device 102 determining an application layer QoS measurement, such as RTT, PLR, and/or the like. As another example, in some example embodiments, operation 620 can include determining whether any RLC segmentation has been observed and/or an amount of RLC segmentation that has been observed. It will be appreciated, however, that other indications of loading on the serving base station 104 that can be measured or otherwise observed by the wireless communication device 102 can be used in addition to or in lieu of an application layer QoS measurement and/or RLC segmentation in accordance with various example embodiments.

Operation 630 can include the wireless communication device 102 adaptively modifying the threshold channel quality metric based at least in part on the level of loading on the serving base station 104.

For example, if the threshold channel quality metric is a SINR threshold(s) and a application layer QoS measurement has been determined in operation 620, operation 630 can include the wireless communication device 102 modifying the SINR threshold based at least in part on a monitored application layer QoS measurement. For example, if the RTT starts increasing, a $SINR_{rxd\_disable}$ threshold can be increased and/or $SINR_{rxd\_enable}$ threshold can be decreased. By way of non-limiting example, in some example embodiments, operation 630 can include adaptively defining a threshold SINR based at least in part on application layer measurements indicative of loading on the serving base station 104 as follows:

If $RTT_{meas} \geq RTT_{high\_thres}, SINR_{rxd\_disable} = \min(\alpha SINR_{rxd\_disable}, SINR_{max})$;

If $RTT_{meas} \leq RTT_{low\_thres}, SINR_{rxd\_enable} = \max(\beta SINR_{rxd\_enable}, SINR_{min})$;

$\alpha > 1, \beta < 1$

As another example, if the threshold channel quality metric is a SINR threshold(s) and RLC segmentation has been observed in operation 620, operation 630 can include the wireless communication device 102 if adaptively modifying the threshold SINR based at least in part on observed RLC segmentation. As a non-limiting example, $SINR_{rxd\_disable}$ can be increased and/or $SINR_{rxd\_enable}$ can be decreased by some margin in response to detection of RLC segmentation. As another example, after detecting a threshold number of non-segmented packets, the wireless communication device 102 can modify an SINR threshold, such as by decreasing $SINR_{rxd\_disable}$ and/or increasing $SINR_{rxd\_enable}$ by some margin.

In some example embodiments, the method of FIG. 6 can return to operation 620 after performance of operation 630. In this regard, in some example embodiments, adaptive definition of a threshold channel quality metric for enabling/disabling receiver diversity may be an ongoing process as conditions such as channel conditions, data traffic patterns, and or the like change.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method to configure receiver diversity for a wireless communication device, the method comprising:

by an apparatus of the wireless communication device:
comparing a physical layer channel quality measurement to a physical layer channel quality metric threshold;
comparing an application layer measurement to an application layer measurement threshold; and
enabling receiver diversity to cause the wireless communication device to use multiple receiver signal chains to receive signals from a wireless network when (i) the physical layer channel quality measurement satisfies the physical layer channel quality metric threshold for disabling receiver diversity and (ii) the application layer measurement fails to satisfy the application layer measurement threshold for disabling receiver diversity, wherein the physical layer channel quality metric threshold is based at least in part on the application layer measurements.

2. The method of claim 1, further comprising:
enabling receiver diversity to cause the wireless communication device to use multiple receiver signal chains to receive signals from the wireless network when the physical layer channel quality measurement fails to satisfy the physical layer channel quality metric threshold for disabling receiver diversity.

3. The method of claim 1, further comprising:
disabling receiver diversity to cause the wireless communication device to use at most a single receiver signal chain to receive signals from the wireless network when (i) the physical layer channel quality measurement satisfies the physical layer channel quality metric threshold for disabling receiver diversity and (ii) the application layer measurement satisfies the application layer measurement threshold for disabling receiver diversity.

4. The method of claim 1, further comprising:
determining an active data traffic pattern associated with an active application implemented on the wireless communication device,
wherein the physical layer channel quality metric threshold is based at least in part on a physical layer channel quality needed to support the active data traffic pattern associated with the active application.

5. The method of claim 4, wherein the application layer measurement threshold is based at least in part on an application layer quality of service (QoS) needed to support the active application.

6. The method of claim 4, wherein the active data traffic pattern comprises one or more of: a data rate, a frequency of data communication, a packet size, or a packet inter-arrival time.

7. The method of claim 4, wherein the physical layer channel quality metric threshold is based at least in part on a physical layer channel quality required to sustain at least a minimum channel quality indicator (CQI) to support the active data traffic pattern.

8. The method of claim 1, wherein the physical layer channel quality metric threshold comprises a signal-to-interference-plus-noise ratio (SINR) threshold.

9. The method of claim 1, wherein the application layer measurement threshold is based at least in part on a round trip time (RTT) measured at an application layer.

10. The method of claim 1, wherein the application layer measurement threshold is based at least in part on a packet loss rate (PLR) measured at an application layer.

11. The method of claim 1, wherein the physical layer channel quality metric threshold is based at least in part on a measured indication of loading of a base station serving the wireless communication device.

12. The method of claim 1, wherein the application layer measurement fails to satisfy the application layer measurement threshold when a measured round trip time (RTT) exceeds a RTT threshold.

13. The method of claim 1, wherein the application layer measurement fails to satisfy the application layer measurement threshold when a measured packet loss rate (PLR) exceeds a PLR threshold.

14. An apparatus comprising processing circuitry configurable to cause a wireless communication device to:
compare a physical layer channel quality measurement to a physical layer channel quality metric threshold;
compare an application layer measurement to an application layer measurement threshold; and
enable receiver diversity to cause the wireless communication device to use multiple receiver signal chains to receive signals from a wireless network when (i) the physical layer channel quality measurement satisfies the physical layer channel quality metric threshold for disabling receiver diversity and (ii) the application layer measurement fails to satisfy the application layer measurement threshold for disabling receiver diversity,
wherein the physical layer channel quality metric threshold is based at least in part on the application layer measurements.

15. The apparatus of claim 14, wherein the processing circuitry is further configurable to cause the wireless communication device to:
enable receiver diversity to cause the wireless communication device to use multiple receiver signal chains to receive signals from the wireless network when the physical layer channel quality measurement fails to satisfy the physical layer channel quality metric threshold for disabling receiver diversity.

16. The apparatus of claim 14, wherein the processing circuitry is further configurable to cause the wireless communication device to:
disable receiver diversity to cause the wireless communication device to use at most a single receiver signal chain to receive signals from the wireless network when (i) the physical layer channel quality measurement satisfies the physical layer channel quality metric threshold for disabling receiver diversity and (ii) the application layer measurement satisfies the application layer measurement threshold for disabling receiver diversity.

17. The apparatus of claim 14, wherein the processing circuitry is further configurable to cause the wireless communication device to:
determine an active data traffic pattern associated with an active application implemented on the wireless communication device,
wherein the physical layer channel quality metric threshold is based at least in part on a physical layer channel quality needed to support the active data traffic pattern associated with the active application.

18. The apparatus of claim 17, wherein the application layer measurement threshold is based at least in part on an application layer quality of service (QoS) needed to support the active application.

19. The apparatus of claim 17, wherein the physical layer channel quality metric threshold is based at least in part on a physical layer channel quality required to sustain at least a minimum channel quality indicator (CQI) to support the active data traffic pattern.

20. A non-transitory computer-readable medium storing instructions that, when executed by processing circuitry of a wireless communication device, cause the wireless communication device to:
compare a physical layer channel quality measurement to a physical layer channel quality metric threshold;
compare an application layer measurement to an application layer measurement threshold; and
enable receiver diversity to cause the wireless communication device to use multiple receiver signal chains to receive signals from a wireless network when (i) the physical layer channel quality measurement satisfies the physical layer channel quality metric threshold for disabling receiver diversity and (ii) the application layer measurement fails to satisfy the application layer measurement threshold for disabling receiver diversity,
wherein the physical layer channel quality metric threshold is based at least in part on the application layer measurements.

* * * * *